(12) United States Patent
Zhou et al.

(10) Patent No.: US 12,092,790 B2
(45) Date of Patent: Sep. 17, 2024

(54) OPTICAL EDGE DETECTION BASED ON HIGH EFFICIENCY DIELECTRIC METASURFACE

(71) Applicant: The Regents of the University of California, Oakland, CA (US)

(72) Inventors: Junxiao Zhou, San Diego, CA (US); Zhaowei Liu, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 109 days.

(21) Appl. No.: 17/227,248

(22) Filed: Apr. 9, 2021

(65) Prior Publication Data

US 2021/0318467 A1    Oct. 14, 2021

Related U.S. Application Data

(60) Provisional application No. 63/007,756, filed on Apr. 9, 2020.

(51) Int. Cl.
| | |
|---|---|
| *G02B 1/00* | (2006.01) |
| *G01B 9/08* | (2006.01) |
| *G01B 11/24* | (2006.01) |
| *G02B 5/30* | (2006.01) |
| *G02B 27/28* | (2006.01) |

(52) U.S. Cl.
CPC .............. *G02B 1/002* (2013.01); *G01B 11/24* (2013.01); *G02B 5/3025* (2013.01); *G02B 27/286* (2013.01); *G01B 9/08* (2013.01)

(58) Field of Classification Search
CPC .......... G01B 9/08; G01B 11/24; G02B 1/002; G02B 5/3025; G02B 27/286
See application file for complete search history.

(56) References Cited

U.S. PATENT DOCUMENTS

2021/0063717 A1* 3/2021 Valentine ............... G02B 21/12

OTHER PUBLICATIONS

Junxiao Zhou, Haoliang Qian, Ching-Fu Chen, Junxiang Zhao, Guangru Li, Qianyi Wu, Hailu Luo, Shuangchun Wen, Zhaowei Liu, "Optical edge detection based on high-efficiency dielectric metasurface", Proceedings of the National Academy of Sciences (PNAS), vol. 116, No. 23, 2019, pp. 11137-11140 (Year: 2019).*

Junxiao Zhou, Haoliang Qian, Ching-Fu Chen, Junxiang Zhao, Guangru Li, Qianyi Wu, Hailu Luo, Shuangchun Wen, Zhaowei Liu, "Optical edge detection based on high-efficiency dielectric metasurface", Proceedings of the National Academy of Sciences (PNAS), Appendix, vol. 116, No. 23, 2019, pp. 1-6 (Year: 2019).*

Saba, Amirhossein, et al. "Two-dimensional edge detection by guided mode resonant metasurface." IEEE Photonics Technology Letters 30.9 (2018): 853-856. (Year: 2018).*

(Continued)

*Primary Examiner* — Dominic J Bologna
(74) *Attorney, Agent, or Firm* — Mintz Levin Cohn Ferris Glovsky and Popeo, P.C.

(57) ABSTRACT

In some example embodiments, there may be provided a metasurface for edge detection. The metasurface may include a nano or subwavelength surface structure configured to provide an output having optical separation to enable detection of at least one edge of an object being illuminated, wherein the optical separation is based on a phase profile configured on the nano or subwavelength surface structure of the metasurface.

16 Claims, 12 Drawing Sheets
(12 of 12 Drawing Sheet(s) Filed in Color)

(56) References Cited

OTHER PUBLICATIONS

Komar, Andrei, et al. "Dielectric metasurface based advanced image processing." SPIE Micro+ Nano Materials, Devices, and Applications 2019. vol. 11201. SPIE, 2019. (Year: 2019).*
Zhu, Tengfeng, et al. "Plasmonic computing of spatial differentiation." Nature communications 8.1 (2017): 15391. (Year: 2017).*
Cordaro, Andrea, et al. "High-index dielectric metasurfaces performing mathematical operations." Nano letters 19.12 (2019): 8418-8423. (Year: 2019).*
Bomzon, Ze'ev, et al. "Space-variant Pancharatnam-Berry phase optical elements with computer-generated subwavelength gratings." Optics letters 27.13 (2002): 1141-1143. (Year: 2002).*
Abdollahramezani, S. et al., "Analog Computing Using Graphene-Based Metalines," Opt. Lett. 40, 5239-5242 (2015).
Berry, M. V. "In Quantal Phase Factors Accompanying Adiabatic Changes," Proceedings of the Royal Society of London A: Mathematical, Physical and Engineering Sciences, 1984; The Royal Society: pp. 45-57.
Biener, G. et al., "Formation of Helical Beams by Use of Pancharatnam-Berry Phase Optical Elements," Opt. Lett. 27, 1875-1877 (2002).
Bomzon, Z. e. et al., "Pancharatnam-Berry Phase in Space-Variant Polarization-State Manipulations with Subwavelength Gratings," Opt. Lett. 26, 1424-1426 (2001).
Bomzon, Z. e. et al., "Space-Variant Pancharatnam-Berry Phase Optical Elements with Computer-Generated Subwavelength Gratings," Opt. Lett. 27, 1141-1143 (2002).
Bykov, D. A. et al., "Optical Computation of the Laplace Operator Using Phase-Shifted Bragg Grating," Opt. Express 22, 25084-25092 (2014).
Caulfield, H. J. et al., "Why Future Supercomputing Requires Optics," Nat. Photonics 4, 261 (2010).
Chizari, A. et al., "Analog Optical Computing Based on a Dielectric Meta-Reflect Array," Opt. Lett. 41, 3451-3454 (2016).
Doskolovich, L. L. et al., "Spatial Differentiation of Optical Beams Using Phase-Shifted Bragg Grating," Opt. Lett. 39, 1278-1281 (2014).
Farmahini-Farahani, M. et al., "Metasurfaces Nanoantennas for Light Processing," JOSA B 30, 2365-2370 (2013).
Golovastikov, N. V. et al., "Spatial Optical Integrator Based on Phase-Shifted Bragg Gratings," Opt. Commun. 338, 457-460 (2015).
Goodman, C. "The Digital Revolution: Art in the Computer Age," Art Journal 49, 248-252 (1990).
Goodman, J. "Introduction to Fourier Optics," (2005).
Hakobyan, D. et al., "Left-Handed Optical Radiation Torque," Nat. Photonics 8, 610-614 (2014).
Hu, H. "Plasmonic Dark Field Microscopy," Appl. Phys. Lett. 96, 113107 (2010).

Huang, L. et al., "Dispersionless Phase Discontinuities for Controlling Light Propagation," Nano Lett. 12, 5750-5755 (2012).
Hubel, D. H. et al., "Receptive Fields, Binocular Interaction and Functional Architecture in the Cat's Visual Cortex," *The Journal of physiology* 160, 106-154 (1962).
Hwang, Y. et al., "Optical Metasurfaces for Subwavelength Difference Operations," Appl. Phys. Lett. 109, 181101 (2016).
Lin, D. et al., "Dielectric Gradient Metasurface Optical Elements," Science 345, 298-302 (2014).
Luo, W. et al., "Photonic Spin Hall Effect with Nearly 100% Efficiency," Adv. Opt. Mater. 3, 1102-1108 (2015).
Luo, X.-G. et al., "Broadband Spin Hall Effect of Light in Single Nanoapertures," Light: Science & Applications 6, e16276 (2017).
Marrucci, L. et al., "Optical Spin-to-Orbital Angular Momentum Conversion in Inhomogeneous Anisotropic Media," Phys. Rev. Lett. 2006, 96, 163905.
Pancharatnam, S. "In Generalized Theory of Interference, and Its Applications," Proceedings of the Indian Academy of Sciences-Section A, 1956; Springer: pp. 247-262.
Pors, A. et al., "Analog Computing Using Reflective Plasmonic Metasurfaces," Nano Lett. 15, 791-797 (2014).
Robinson, M. D. Et al., "Joint Digital-Optical Design of Super-resolution Multiframe Imaging Systems," Appl. Opt. 47, B11-B20 (2008).
Ruan, Z. "Spatial Mode Control of Surface Plasmon Polariton Excitation with Gain Medium: From Spatial Differentiator to Integrator," Opt. Lett. 40, 601-604 (2015).
Saba, A. et al., "Two-Dimensional Edge Detection by Guided Mode Resonant Metasurface," IEEE Photonics Technology Letters 30, 853-856 (2018).
Shaltout, A. et al., "Photonic Spin Hall Effect in Gap-Plasmon Metasurfaces for on-Chip Chiroptical Spectroscopy," Optica 2, 860-863 (2015).
Shimotsuma, Y. et al., "Self-Organized Nanogratings in Glass Irradiated by Ultrashort Light Pulses," Phys. Rev. Lett. 91, 247405 (2003).
Shitrit, N. et al., "Optical Spin Hall Effects in Plasmonic Chains," Nano Lett. 11, 2038-2042 (2011).
Silva, A. et al., "Performing Mathematical Operations with Metamaterials," Science 343, 160-163 (2014).
Solli, D. R. et al., "Analog Optical Computing," Nat. Photonics 9, 704 (2015).
Yin, X. et al., "Photonic Spin Hall Effect at Metasurfaces," Science 339, 1405-1407 (2013).
Youssefi, A. et al., "Analog Computing by Brewster Effect," Opt. Lett. 41, 3467-3470 (2016).
Zhou, J. et al., "Broadband Photonic Spin Hall Meta-Lens," ACS nano 12, 82-88 (2018).
Zhu, T. et al., "Plasmonic Computing of Spatial Differentiation," Nat. Commun. 8, 15391 (2017).

* cited by examiner

OPTICAL EDGE DETECTION BASED ON HIGH EFFICIENCY DIELECTRIC METASURFACE

CROSS-REFERENCE TO RELATED APPLICATIONS

This application claims priority to provisional U.S. application Ser. No. 63/007,756, entitled "OPTICAL EDGE DETECTION BASED ON HIGH EFFICIENCY DIELECTRIC METASURFACE" and filed Apr. 9, 2020, the contents of which is hereby incorporated by reference in its entirety.

SUMMARY

In some example embodiments, there may be provided a metasurface for edge detection. The metasurface may include a nano or subwavelength surface structure configured to provide an output having optical separation to enable detection of at least one edge of an object being illuminated, wherein the optical separation is based on a phase profile configured on the nano or subwavelength surface structure of the metasurface.

In some example embodiments, there may be provided a method which includes detecting, based on a metasurface, at least one edge of an object being illuminated with a light source, wherein the metasurface provides an output that provides optical separation to enable the detecting of the at least one edge, wherein the optical separation is based on a phase profile configured on the metasurface.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to optical edge detection, it should be readily understood that such features are not intended to be limiting. The claims that follow this disclosure are intended to define the scope of the protected subject matter.

DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
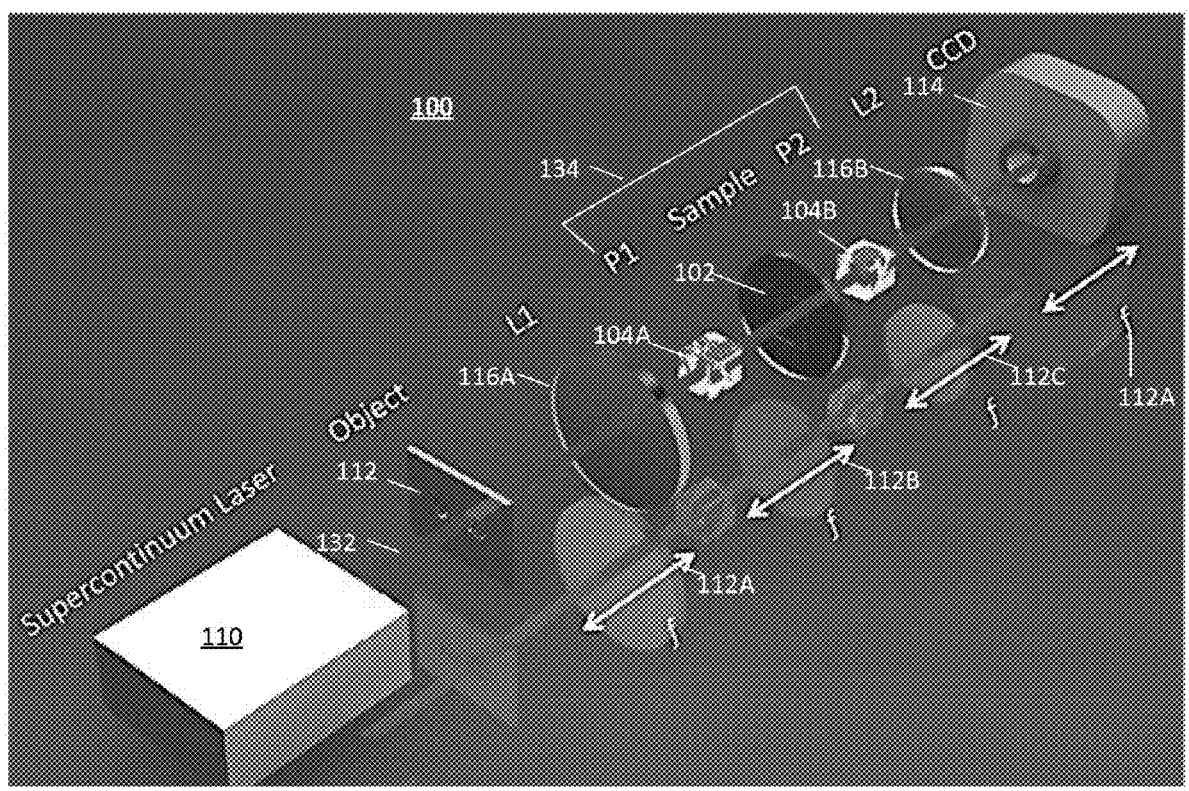
FIG. 1 depicts an example of a system including a metasurface, in accordance with some embodiments.

Edge detection is a fundamental tool in image processing, computing, and machine vision. In recent years, optical metamaterials and metasurfaces have been suggested to perform edge detection via analog spatial differentiation, which shows superior integration capability compared to the traditional bulky system comprising lenses and spatial filters. Unfortunately, experimental realization of optical-edge detection with metamaterials and metasurfaces remains challenging based on previous theoretical proposals. Moreover, current methods are difficult to achieve broadband edge detection, which can be important for full-color images, for example.

In one aspect, there is provided a new mechanism for edge detection based on a high efficiency dielectric metasurface such as a Pancharatnam-Berry phase metasurface. The Pancharatnam-Berry (PB) metasurface may comprise an arrangement of subwavelength scatterer, such that the Pancharatnam-Berry metasurface is configured such that a linear polarized light incident on the PB metasurface creates an output including a left hand circular polarization component of the incident light and a right hand circular polarization component of the incident light. These left and right hand circular polarization components are spatially separated in the optical domain. This spatial separation may be leveraged for edge detection.

Optical edge detection is a way to characterize boundaries. Although the field of metamaterials and metasurface is rapidly moving towards the miniaturization of optical devices, experimental realization of optical-edge detection with metamaterials remains a challenge and lags behind theoretical proposals. Using a designed dielectric metasurface, such as the PB metasurface disclosed herein, broadband edge detection may be performed with high optical efficiency. The metasurfaces disclosed herein may be fabricated by scanning a focused laser beam inside a glass substrate, and may be readily integrated with optical components. The disclosed metasurface-based edge detection may have a variety of applications including, for example, image processing, high-contrast microscopy, real-time object detection on compact optical platforms (e.g., mobile phones, smart cameras, and/or the like).

In some embodiments, there is provided a metasurface configured to provide edge detection. In some embodiments, the metasurface provides edge detection based on nano or subwavelength metasurface structures that create optical spatial separation in the output of the metasurface. The term "metasurface" refers to an artificial sheet material with sub-wavelength thickness. The metasurface may include a structure, such as a periodic structure of nano or subwavelength patterns. For example, the metasurface's structure may cause the separation based on a phase profile configured on the metasurface. The phase profile refers to an orientation on the metasurface structure causing a desired phase response in the output of the metasurface. In some instances, the metasurface's nano or subwavelength structure may create a spin-orbit interaction of light, such that the metasurface causes a scattering (or divergence) of the incident light. In some example embodiments, input light on the metasurface's structure creates an output comprising right and left hand circular components.

In some embodiments, the metasurface is positioned between two aligned linear polarizers, and the two linear polarizers may be orthogonal to each other. These two aligned, orthogonal linear polarizers may filter (e.g., block or remove) an overlap in the right and left hand circular components of the incident image of the object, such that the output of the second linear polarizer results in an image of the edges of the object (thus providing edge detection of the object).

In some embodiments, the metasurface comprises a Pancharatnam-Berry (PB) phase metasurface located between the two orthogonally, aligned linear polarizers, and although metasurfaces other than the PB phase metasurface (e.g., dynamic phase metasurfaces) may be realized as well.

In some embodiments, the metasurface is a one-dimensional (1D) metasurface. In some embodiments, the surface structure may have an orientation that varies from 0 to $\pi$ radians, which causes a phase in the optical output of the metasurface that varies from 0 radians through $2\pi$ radians. This orientation may be along one dimension (e.g., the x-axis, y-axis, etc.). For example, the surface structures may induce or create a spin-orbit interaction of light, such that the metasurface causes a scattering (or divergence) of the output into right and left hand circular components. This spatially separated output may be used for edge detection. In some embodiments, the 1D metasurface comprises a Pancharatnam-Berry (PB) phase metasurface, although in other embodiments non-PB phase metasurfaces (e.g., dynamic phase metasurfaces, etc.) may be used as well.

In some embodiments, the metasurface is a two-dimensional (2D) metasurface. In some embodiments, the surface structure of the 2D metasurface may have an orientation that varies from 0 to $\pi$ radians (e.g., an orientation that varies from 0 to $\pi$ radians along a plurality of radial directions). Like the 1D case, this surface structures provides an output including spatially separate components. For example, the output may include a right hand circular polarized image separated along a plurality of radial directions from a left hand circular polarized image of the illuminated object. This spatially separated output may be used for edge detection.

In some embodiments, there is provided a metasurface and, in particular, a metalens. The metalens includes a surface or phase profile formed as a combination or a summation of two laterally-shifted lens phases with identical focal length f. The corresponding image outputs from the metalens are delayed by phase $\pi$, causing thus intensity subtraction in an overlapping region and a laterally-differentiated image, which provides 1D edge detection. In some embodiments, the metalens is diagonally shifted, in which case the differentiated image is a 2D detected image.

FIG. 1 depicts an example of a system 100 including a metasurface 102 in the optical path, in accordance with some embodiments. The optical path 132 (which is provided by the system) includes a light source 110, such as a laser, followed by an object 112 (which is undergoing the optical edge detection), followed by an optical device 116A (e.g., a lens, a filter, a prism, etc.), followed by a first linear polarizer 104A, followed by a metasurface 102, followed by a linear polarizer 104B, followed by another optical device 116B (e.g., a lens, a filter, a prism, etc.), and then an optical detector 114. In the example of FIG. 1, the spacing "f" refers to "focal length." The first linear polarizer and the second linear polarizer may be orthogonal. For example, the first linear polarizer may be vertically polarized, while the second linear polarizer may be horizontally polarized, or for example, the first linear polarizer may be horizontally polarized, while the second linear polarizer may be vertically polarized. The system 100 may provide edge detection of the object 112, and may provide tunable optical resolution at the resultant detected edges (e.g., the light source may be tunable or tuned to a specific wavelength(s)). Furthermore, there may also be provided metasurface orientation dependent edge detection.

In the example of FIG. 1, the structure of the linear polarizers 104A, metasurface 102, and linear polarizer 104B may provide an optical spatial separation (e.g., of the right and left hand circular polarization components) which can be used for edge detection of an image of an object 112. As noted, the metasurface may be implemented using a high efficiency, dielectric metasurface, such as a designed Pancharatnam-Berry (PB) phase metasurface, and the polarizers 104A-B may be implemented using two orthogonally, aligned linear polarizers. Unlike conventional spatial differentiator approaches, the operations of the optical spatial differentiator 134 of system 100 is implemented using a high efficiency dielectric metasurface 102, such as the PB phase metasurface, so the metasurface is not dependent on complex layered structures or critical plasmonic coupling conditions, but instead dependent on spin-to-orbit interactions.

In the example of FIG. 1, the metasurface 102 may be used for splitting (e.g., separating, diverging, etc.) the left-hand circularly polarized (LCP) component (e.g., light beam) and right-hand circularly polarized (RCP) component into two slightly offset, different spatial directions.

Figure 2A:
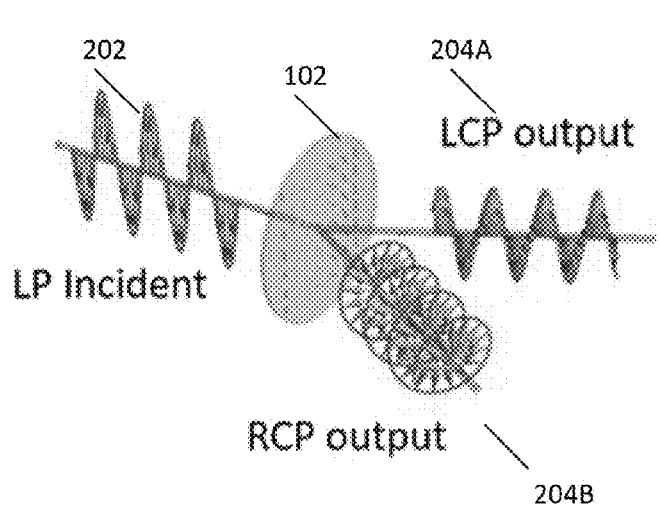
FIG. 2A depicts an example of a metasurface, in accordance with some embodiments.

FIG. 2A depicts an example of the metasurface 102, in accordance with some embodiments. The metasurface 102 receives, as an input, linear polarized light 202 (which may be, for example, the light output of the linear polarizer 104A). Although FIG. 2A depicts the linear polarization as vertical at 202, the polarization may be horizontal (in which case the second polarizer would be vertical).

When a linear-polarized plane wave 202 is incident on a PB phase gradient metasurface 102 having phase $$\varphi(x, y) = \frac{\pi x}{\Lambda}$$

Figure 2B:
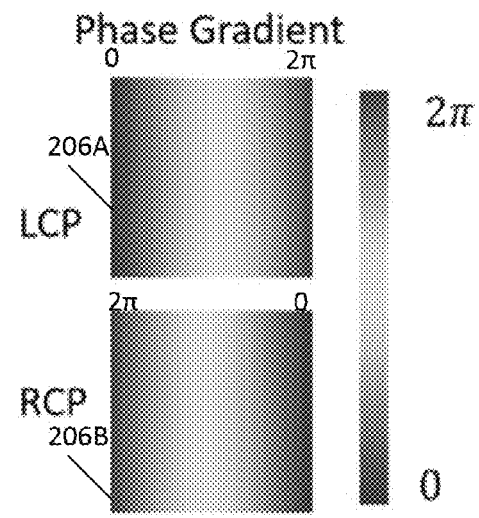
FIG. 2B depicts the phase gradient of the metasurface's output, in accordance with some embodiments.
Figure 2C:
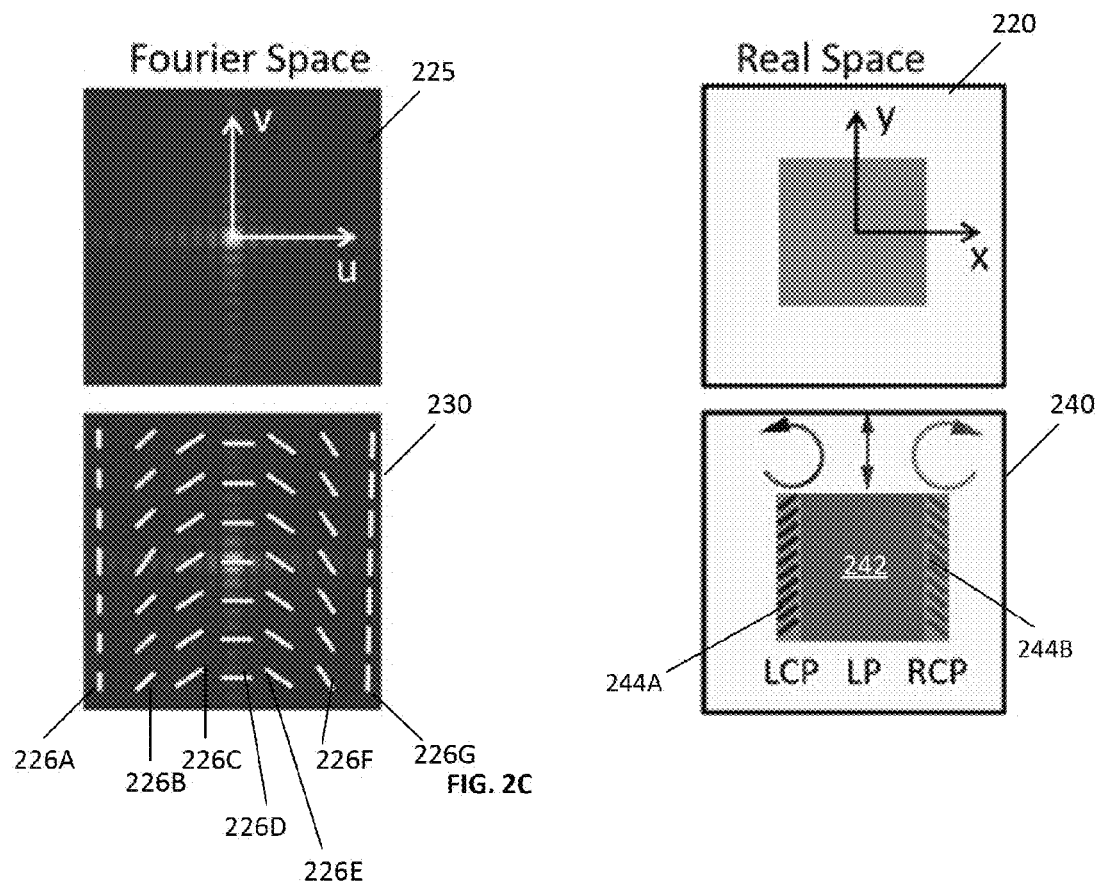
FIG. 2C depicts various aspects of the metasurface, in accordance with some embodiments.

(e.g., assuming the phase gradient direction is along x axis with period of Λ), the LCP 204A and RCP 204B components gain additional phase (e.g., +2φ and −2φ, respectively), which is depicted in the plot of the LCP's 204A phase gradients 206A and the plot of the RCP's phase gradient 206B at FIG. 2B. Assuming a square shaped object 112 illuminated by a linearly polarized (LP) light along x direction for example, the object's electric field distribution may be written as $E_{in}(x, y)$ at the object (or image) plane (which is plotted at FIG. 2C at 220, for example) and Ẽ (u, v) at Fourier plane (see plot at 225 at FIG. 2C for the Fourier magnitude spectrum plot).

When the PB phase gradient metasurface 102 is introduced at the Fourier plane as shown at 230 (e.g., the metasurface's phase gradient represented by the bars 226A, 226B, and so forth which are initially vertical and transition gradually to horizontal and back to vertical to provide a 0 to 2π phase gradient change at the output), the output electrical field at the image plane may be given as follows:

$$E_{out}(x, y) = E_{in}[(x - \Delta), y]\begin{bmatrix} 1 \\ -i \end{bmatrix} + E_{in}[(x + \Delta), y]\begin{bmatrix} 1 \\ i \end{bmatrix}. \quad (1)$$

As such, the LCP 204A and RCP 204B components possess opposite phase gradient (see also 206A and 206B), so the LCP and RCP components (e.g., images) are translated a distance of $$\Delta = \frac{\lambda f}{\Lambda}$$

but with opposite directions as shown at 240. In the example is example, λ is the working wavelength, and f is the focus length. In other words, the metasurface includes a periodic nano or subwavelength structure patterned on the metasurface. The bars 226A-G (as well as the other bars) represent an orientation of the structure on the metasurface. As can be seen, the structure varies from in 1D (which in the example is the x-axis) from 0-π radians as sown at 226A-G. This structure provides a polarization dependent phase gradient, which can be used, as noted, for edge detection.

When the LCP 204A and RCP 204B components output by the metasurface 102 pass through the second linear polarizer 104B, the overlapping linear portion (LP) 242 does not pass through the second polarizer 104B while the LCP and RCP portions (244A-B) pass through the second polarizer 140, providing thus optical edge detection of the object's image (which in this example is a square object). The optical detector 114 would capture the edge detection 244A-B provided the linear polarizer 104A, metasurface 102, and linear polarizer 104B optical separator structure. The $E_{out}$ of the electrical field through the system 100 may be represented as follows:

$$E_{out\_edge}(x, y) = (E_{in}[(x + \Delta), y] - E_{in}[(x - \Delta), y])\begin{bmatrix} 0 \\ i \end{bmatrix}. \quad (2)$$

And, if the shift Δ is much smaller than the image profile, $E_{out\_edge}$ (x, y) may be approximately proportional to the first-order spatial differentiation of the input $E_{in}$ (x, y):

$$E_{out\_edge}(x, y) \simeq 2\Delta \frac{dE_{in}(x, y)}{d(x)}. \quad (3)$$

Referring again to FIG. 1, the system 100 may operate as follows. The object 112 is illuminated by a light source, such as laser 110, as the light is allowed to pass though the linear polarizer 104A to create linearly polarized light, such as 202. This linearly polarized light propagates through the metasurface 202, such that the left- and right-handed photons with opposite spin angular momentum acquire opposite extrinsic orbit angular momentum by interacting with the metasurface (e.g., as indicated by Equation (1)). This results in LCP and RCP image components with a tiny shift at the image plane. The overlapped LCP and RCP components (e.g., region 242) may be recombined by the linear polarizer 104B and may thus be eliminated, such that only the image's edges 244A-B remain for optical detector 114.

In some embodiments, the light source 112 may output linearly polarized light, in which case the first linear polarizer 104A may be omitted. In some embodiments, the optical detector 114 includes the second linear polarizer 104B, in which case the second linear polarizer may be omitted.

Figure 3:
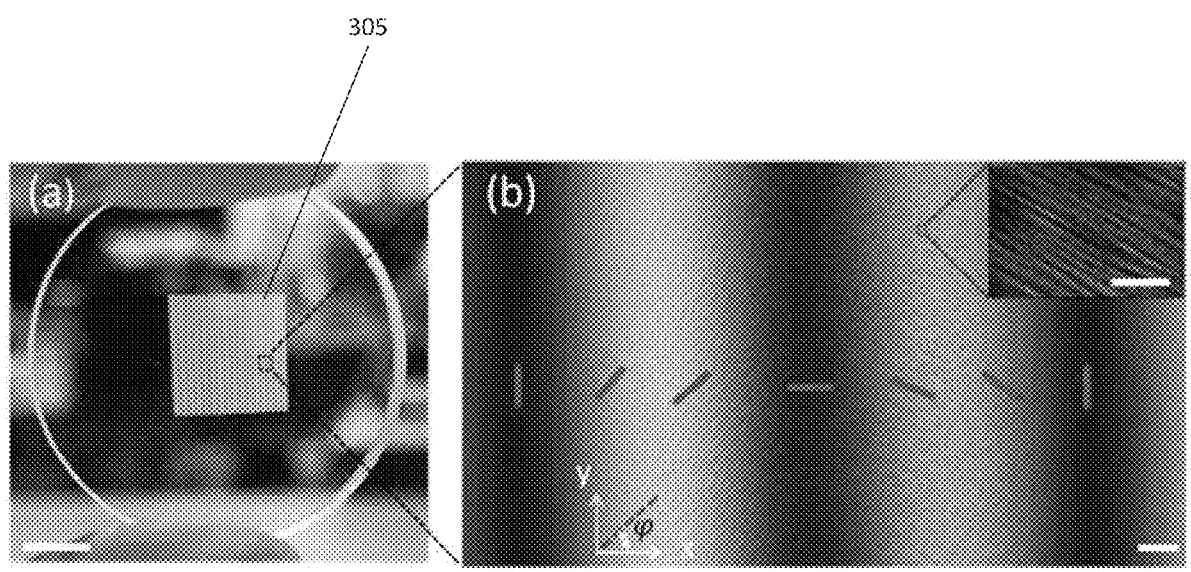
FIG. 3 depicts an example implementation of the metasurface, in accordance with some embodiments.

FIG. 3 shows an example implementation of the metasurface 102, in accordance with some embodiments. In the example of FIG. 3, the metasurface is comprised on a form-birefringent nanostructured glass slab as shown at 305. For example, the diameter of the glass substrate may be about 2.5 cm, with a thickness is 3 mm, and a pattern area of the sample metasurface is 8 mm by 8 mm, although other sizes may be implemented as well. The metasurface pattern may be fabricated by a femtosecond pulse laser inside of glass 50 μm beneath the surface. Under laser irradiation, a plasma of high free electron density is generated by a multiphoton ionization process. The interference between the plasma and the incident light beam leads to a stripe-like nanostructure. By controlling the polarization of incident beam, the desired orientation of the nanostructure (which may be perpendicular to this polarization) may be obtained.

Figure 4:
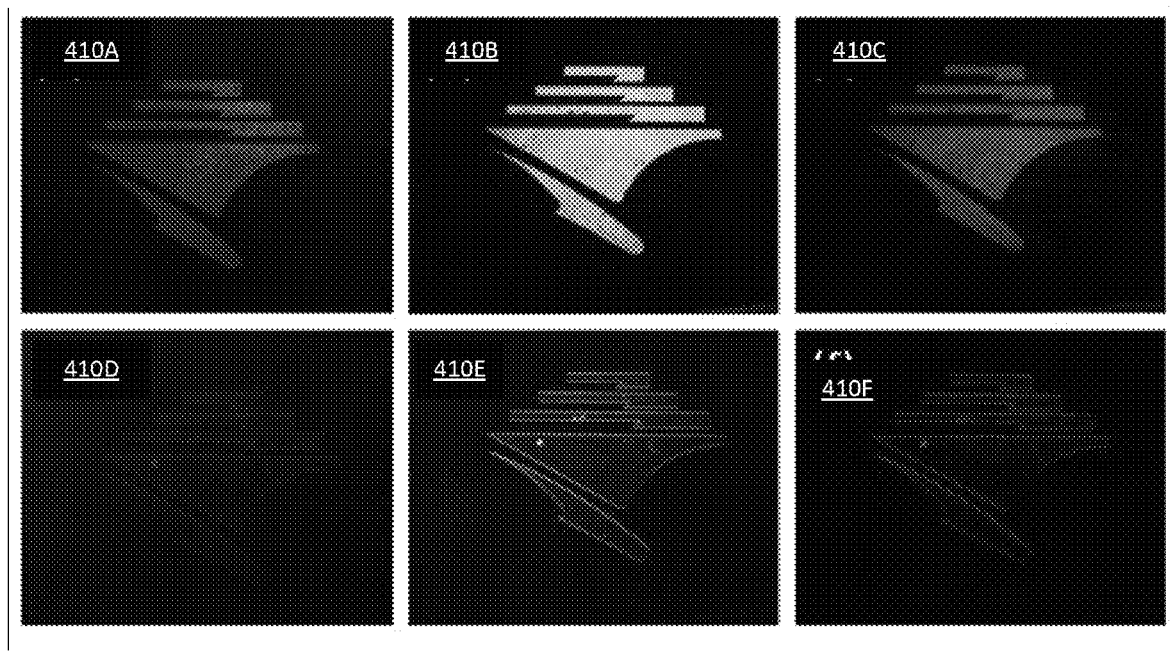
FIGS. 4-7 depict example output images of the edge detection provided by the metasurface, in accordance with some embodiments.

FIG. 4 depicts an example of edge detection results obtained based on the system 100 including the metasurface 102, in accordance with some embodiments. The object 112 is a logo. As noted, the system 100 is a 4f system including two lenses 116A-B (e.g., two lenses having the same or similar optical properties), wherein the focal length (f) depends on the index of refraction of the materials used in the optical path. The first lens 116A and the second lens may be 2f apart in distance. The metasurface 102 is placed at one focal length (f) behind the first lens 116A and one focal length in front of the second lens 116B. The first lens yields a Fourier transform of the object 112 at its back focal plane, which is at the location of the metasurface 102. In turn, the second lens performs another Fourier transform to output an image duplicate of the object. When the light passes through the 4f system, two phase shifted LCP and RCP images with overlapping area (as described for example with respect to 242) being linear-polarized as shown in FIG. 4 at 410A, 410B, and 410C (which is the output of the metasurface 102 before the second linear polarizer 104B), but after the second linear polarizer 104B, only the edges remain as depicted at 410D-410F. In this example, the light source illumination is at 410A, 410B, and 410C is at 430 nm, 500 nm and 670 nm, respectively; the metasurface 12 has a metasurface period Λ of 8000 μm, for example (although other wavelengths and periods may be implemented as well).

Figure 5:
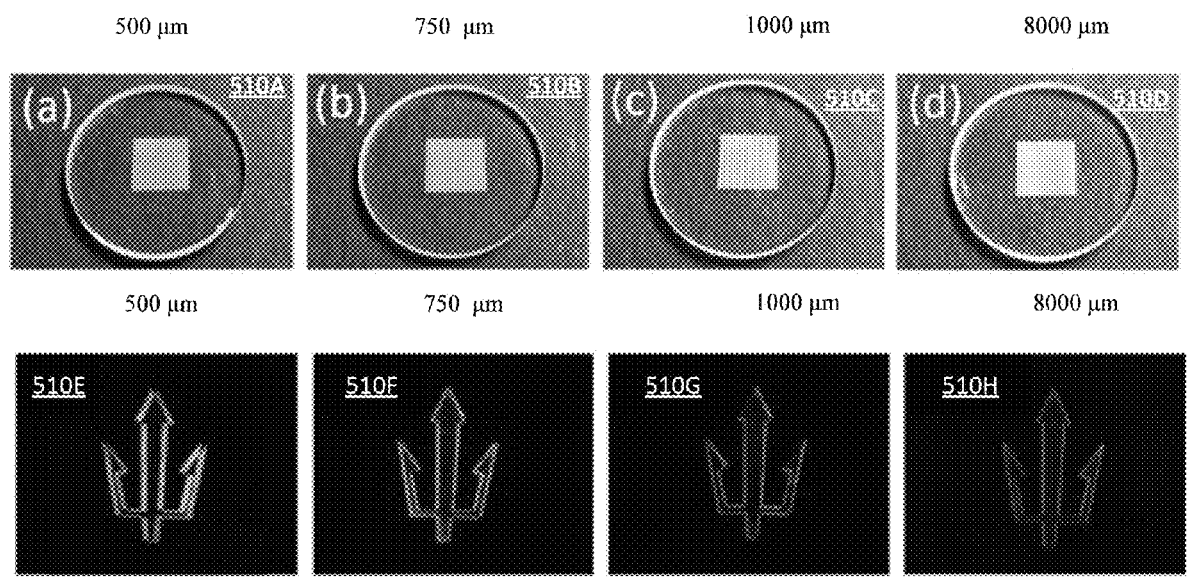

FIG. 5 depicts additional examples of results to demonstrate the tunability of the system 100, in accordance with some embodiments. In the example of FIG. 5, a triton is used as the object 112. The metasurface 102 is configured with phase gradients (or a period of Λ) equal to 500 μm, 750 μm, 1000 μm, and 8000 μm corresponding to 510A-D respectively, and the corresponding edge detection outputs (which can be detected at the optical detector 114) are depicted at 510E-H.

Figure 6:
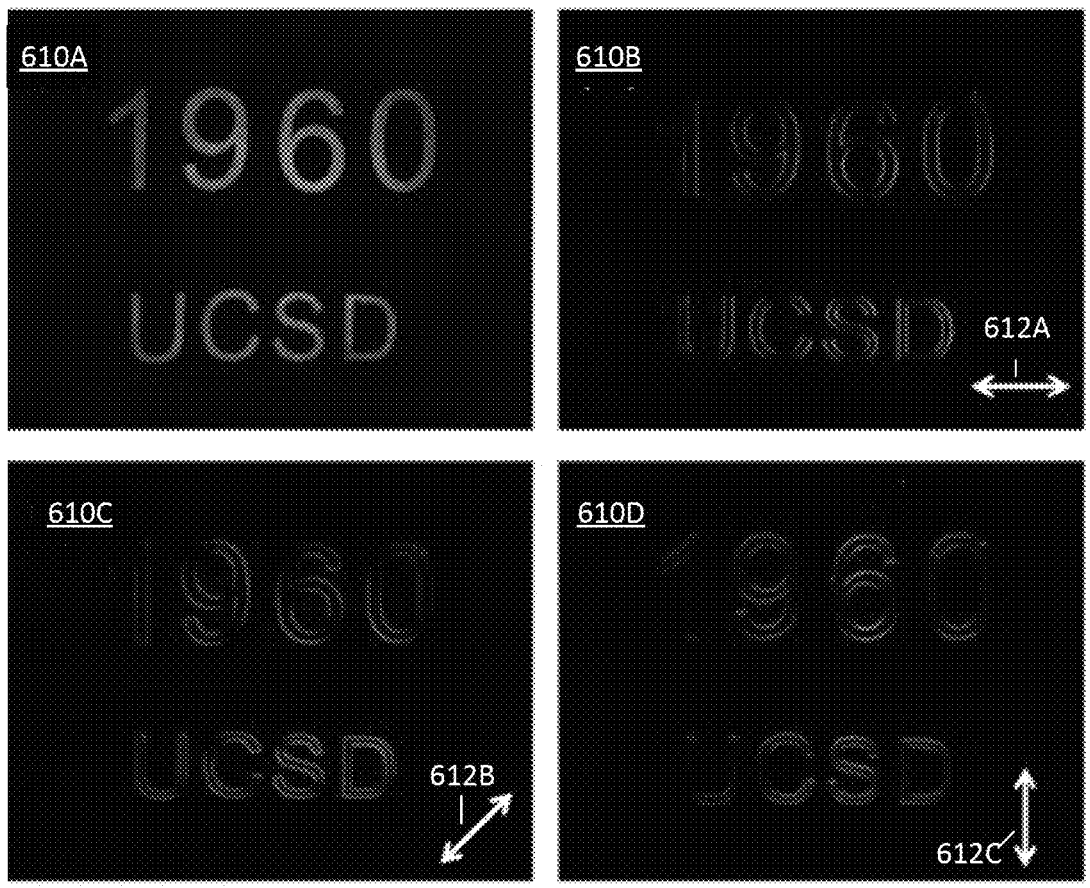

FIG. 6 depicts additional examples of results to demonstrate orientation-dependent edge detection of the system 100, in accordance with some embodiments. The images (e.g., of "1960" and "UCSD") 610A each correspond to the object 112 being processed for edge detection. The metasurface 102 output after the second linear polarizer 104B is depicted at 610B-D. At 610B-D, the metasurface 102 has different orientations as indicated by the arrows 612A-C. As shown, the one-dimensional phase gradient metasurface 102 provides only sensitivity to the edges along the gradient direction (e.g., as indicated by the arrows 612A-C).

The 1D metasurface 102 configuration design described above with respect to FIGS. 1-6 may be extended from one-dimensional to a two-dimensional edge detection (as further described below) by changing the one-dimensional phase gradient $$\left(\text{e.g., } \varphi(x, y) = \frac{\pi x}{\Lambda}\right)$$

to a 2D radial phase gradient $$\left(\varphi(x, y) = \frac{\pi \sqrt{x^2 + y^2}}{\Lambda}\right)$$

to provide a 2D metasurface. In some example embodiments, the 2D metasurface's surface structure includes a structure with an orientation that radially varies from 0 to π radians. Like the 1D case, this surface structure provides a polarization dependent phase gradient that generates (e.g., outputs, creates, etc.) an output including spatially separate components (which in this example is radially extending from the center of the metasurface in a plurality of radial directions), such as right and left hand circular components.

Figure 7:
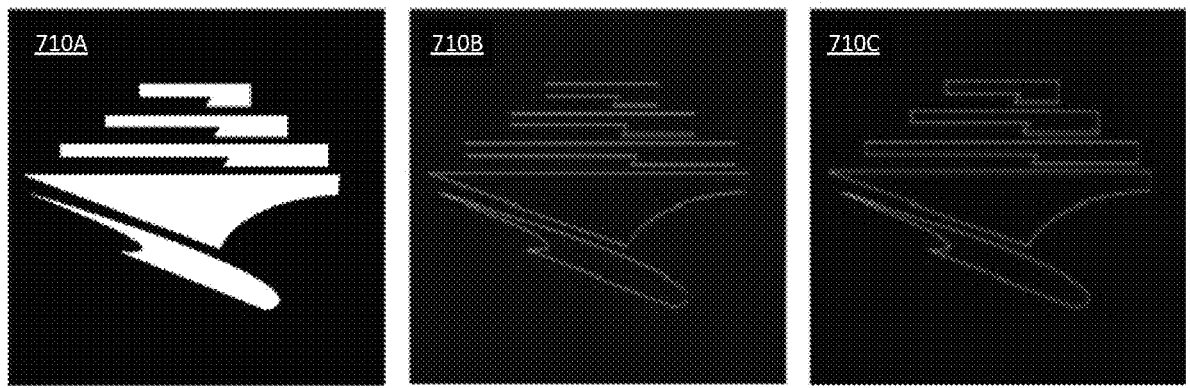

FIG. 7 depicts an example of an image 710A used as the object 112 and the corresponding edge detected output image 710B with the metasurface 102 configured as a 1D metasurface 102 (e.g., detected after the second linear polarizer 104B), and 710C depicts the output image with the metasurface 102 configured as a 2D metasurface (and after the second linear polarizer 104B). As shown at FIG. 7, the 2D metasurface provides at 710C better edge detection in 2D, such as horizontal and vertical, when compared to the 1D metasurface at 710B.

Figure 8:
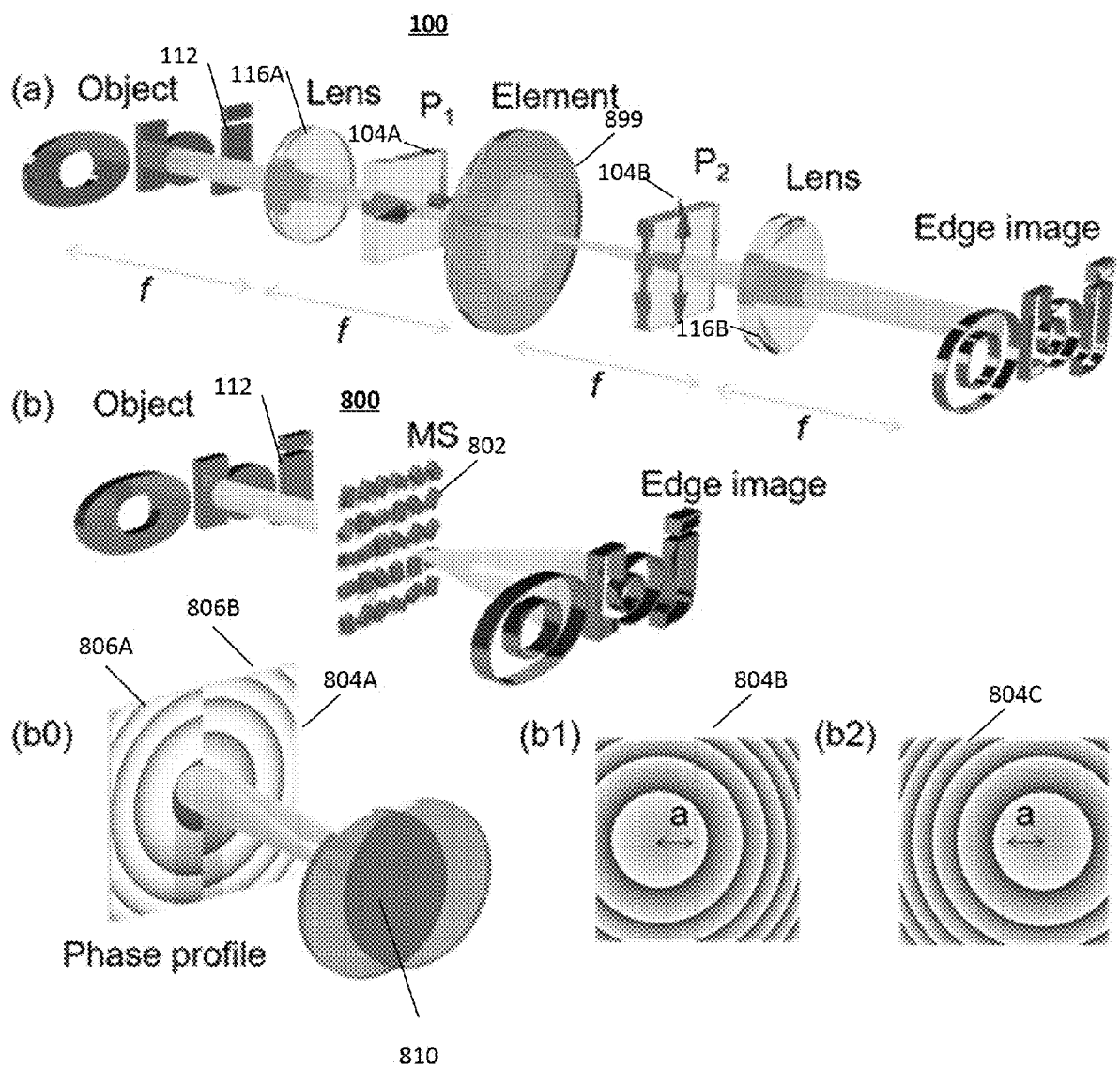
FIG. 8 depicts additional examples metasurfaces, in accordance with some embodiments.

FIG. 8 depicts an example of a 2D metasurface 899 replacing the 1D metasurface of FIG. 1. This 2D metasurface includes a radial surface structure orientation that radiates from the center of the metasurface 899 from 0 to π as noted above.

FIG. 8 also depicts a metasurface 802 (which is also referred to as a metalens as it includes a lens so there is no need for the separate lenses 116A-B or polarizers 104A-B of 100). The phase profile of the metasurface 802 may be the summation of two laterally-shifted lens phases with identical focal length f. As a result, the corresponding images are delayed by phase it, leading to intensity subtraction in the overlapped region and thus a laterally-differentiated image shown in FIG. 8 at 804A-C.

Referring to 804A, the phase profiles of the metasurface (or metalens) 899 includes a nano or subwavelength structure that provides a lens (see, e.g., 804B-C). But unlike metasurface 802, the metasurface 899 is a combination (or summation) of 2 laterally-shifted lens phases (as shown by the lateral offset "a" at each of 804B-C) with the same focal length f. This lateral shift (e.g., at 804B the lateral shift is in the opposite direction to the lateral shift at 804C) causes a π phase delay—causing thus intensity subtraction at the output in the overlapped region 810. In other words, the phases of are offset laterally to create a π radians phase shift and the destructive interference at 810 which can be used for edge detection. This can be extended to 2D edge detection by performing a diagonal shift is implemented as shown at 910A, there is provided 2D edge detection results in x and y directions, as shown in the example results of FIG. 9.

Figure 9:
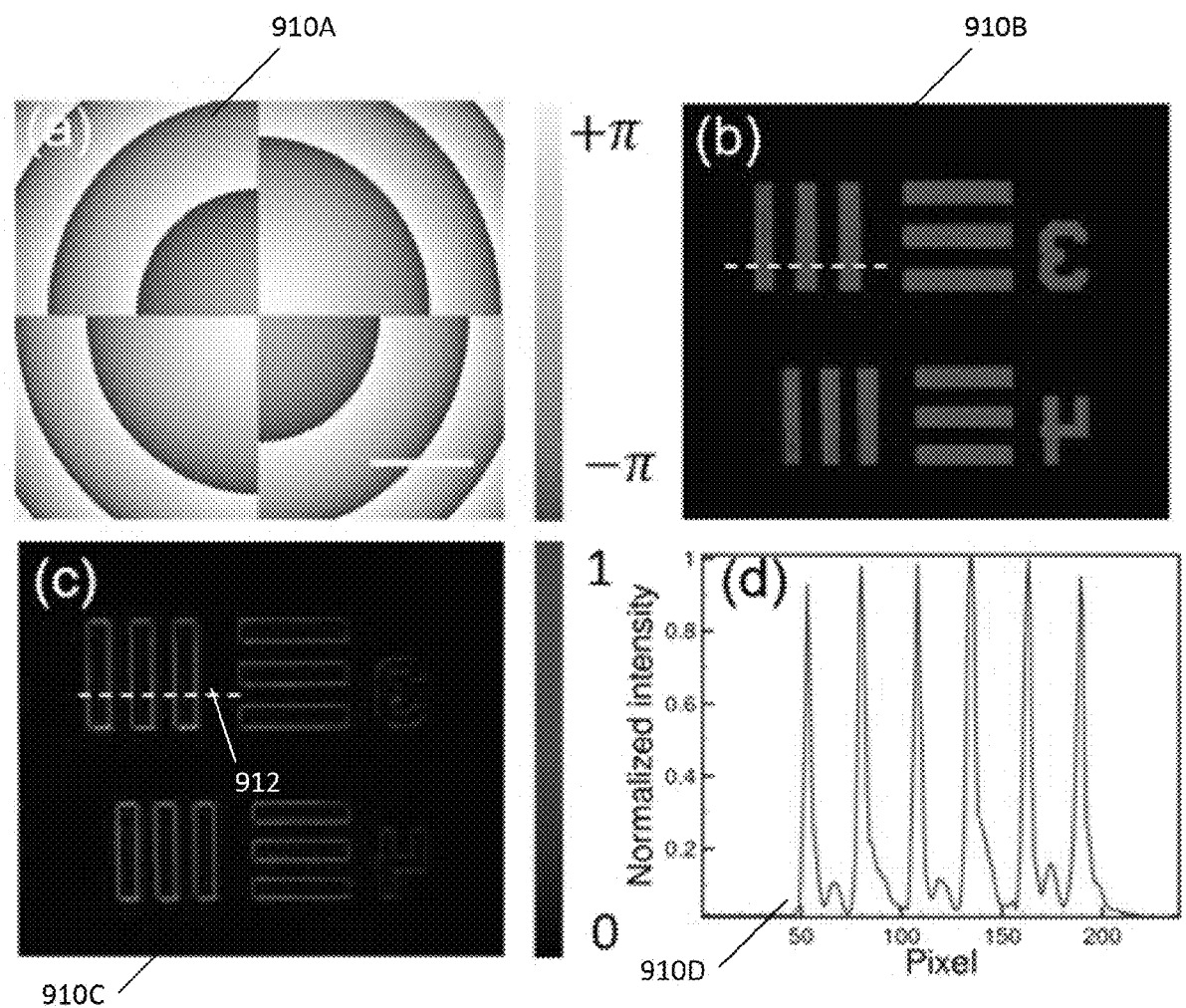
FIG. 9 depicts various aspects of the metasurface of FIG. 8, in accordance with some embodiments.

FIG. 9 at 910A shows an example of the phase profile of the metasurface 2D metasurface (or metalens); 910B shows an optical image of the object undergoing edge detection; edge detection is depicted at 910C; and 910D plots intensity versus pixels for the corresponding cross-section (dashed line at 912) with a very high signal noise ratio. The metasurface phase profile is equal to the sum of two phase profiles for two separate lenses. Each of the phase profiles represents a lens but with a slight image shift along a given direction (e.g., x-axis or y-axis in the case 806A-B or diagonally or radially in the case of 910A). The final edge detected image 910C is thus equal to the sum of the two images, and for edge detection, the overlap area 810 (caused by π phase shift) is be canceled out, so the phase profiles for the two lenses should have a π phase shift.

Figure 10:
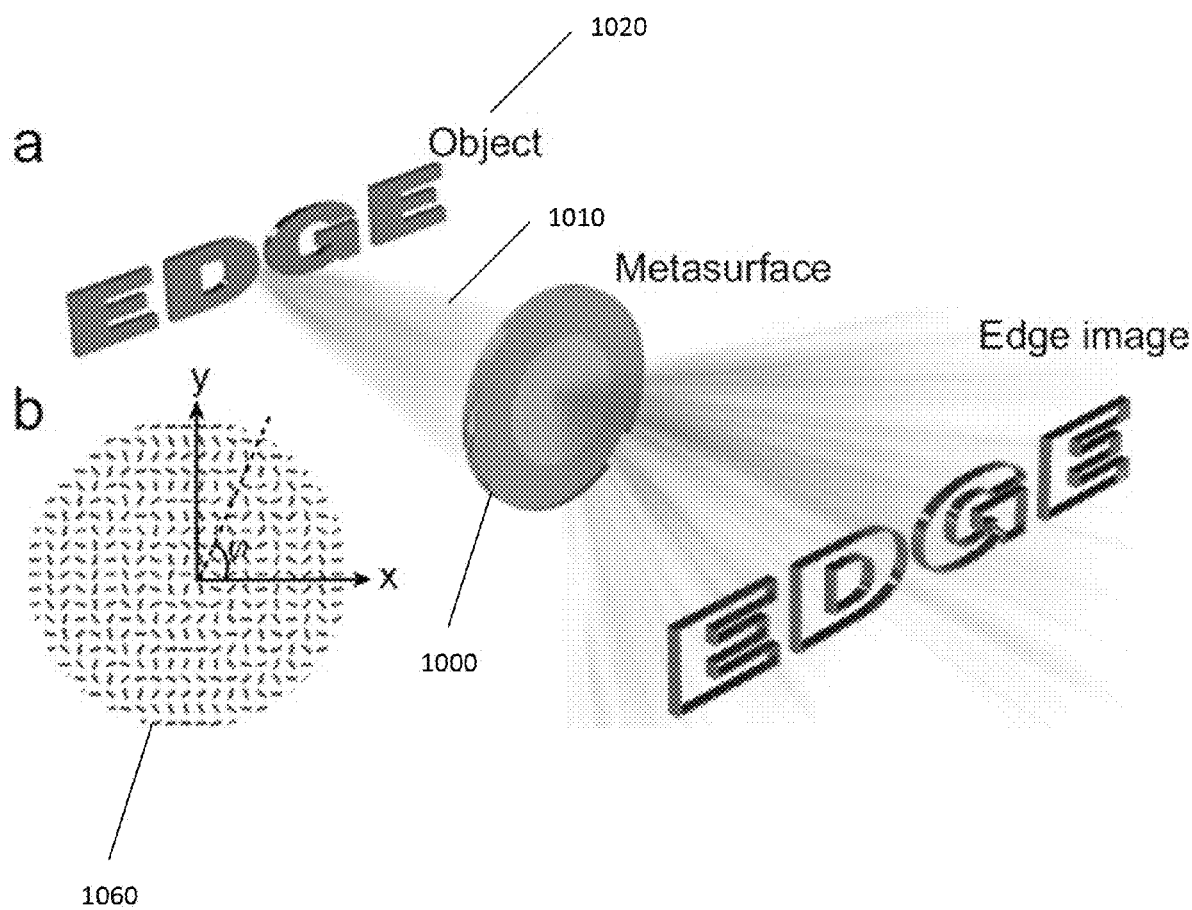
FIG. 10 depicts another example of a metasurface having a radial phase gradient pattern to enable two-dimensional (2D) edge detection, in accordance with some embodiments.

FIG. 10 depicts another example of a metasurface 1000 having a radial phase gradient pattern to enable 2D edge detection, in accordance with some example embodiments. The metasurface 1000 imparts 2D spatial differentiation on the impinging wavefront (which in example of FIG. 10 is depicted in the Fourier domain) 1010 of the object 1020 (which in this example is "EDGE"). In the example of FIG. 10, the metasurface 1000 may be implemented as a so-called metalens incorporating an edge detection metasurface and an image function of an imaging lens. The metasurface 1000 imparts the spatial differentiation based on the dielectric metasurface in transmission mode, which may provide high efficiency, broadband operation, and high-contrast. The metasurface 1000 includes a symmetric phase gradient along the radial direction, which enables linearly polarized (LP) beam splitting to left-handed circular polarization (LCP) and right-handed circular polarization (RCP) components along the radial direction—thus providing the 2D spatial differentiation. The dielectric metasurface (which is based on a geometric phase without any resonance structure) ensures operation at broadband working wavelengths (e.g., the entire visible range) to enable differentiation of color images, for example. The high transmission mode of the compact metasurface 1000 facilitates alignment or integration with other components of the optical system.

When the 1D metasurface 102 (which is sandwiched between two orthogonal polarizers) is placed in the Fourier plane of a 4f system, the amplitude of the output electric field of the object $E_{in}(x_0, y_0)$ can be given as $E(x, y) = E_{in}$ ($x_0+\Delta$, $y_0$)−$E_{in}$($x_0-\Delta$, $y_0$). In the 2D edge detection case, it can be considered a superposition of infinite 1D edge detection processes that radially span the entire a azimuth angles in polar coordinates. The final electric filed may be expressed as follows:

$E_3(x, y) = i\Phi(x_0+\Delta, y_0) - i\Phi(x_0-\Delta, y_0)$ (4), which can be further simplified to $E_{out\_edge}$ (x, y), which is about equal to:

$$2\Delta \frac{\partial \Phi}{\partial \tau}.$$

Figure 11:
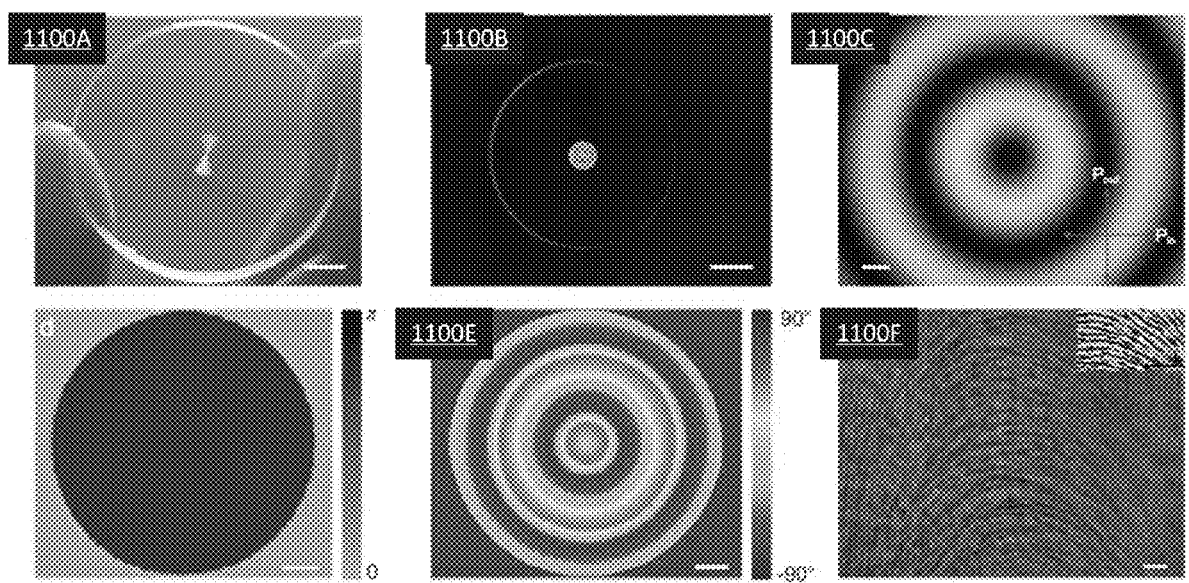
FIG. 11 depict various aspects of an implementation example of a metasurface having a radial phase gradient pattern to enable two-dimensional (2D) edge detection, in accordance with some embodiments.

As shown at FIG. 10, the system including the metasurface 1000 may filter the edge information of the object 1020. The metasurface design and, in particular, the optical axis phase gradient distribution 1060 (e.g., the nano or subwavelength structure may also be represented by the pattern shown at 1060) of the metasurface 1000 is depicted at FIG. 10. FIG. 11 at 1100A shows a photograph of the metasurface 1000 with a patterned area (e.g., 4 mm in diameter) in the center of a 1-inch SiO2 substrate. The thickness of the substrate is 3 mm. FIG. 11 at 1100B depicts a polariscope image of a sample of the metasurface 1000, which reflects the form-birefringent characteristics of the metasurface area. The metasurface pattern in this example is fabricated by scanning a femtosecond pulse laser inside the silica slabs (e.g., 50 μm beneath the surface). The self-assembled nanostructures in silica slabs were formed under intense laser irradiation. By varying the laser polarization gradually, nanostructures with gradually changing orientation could be generated. 1100C depicts a zoomed polariscope optical image of a portion of the sample pattern area of 1100B. At 1100C, measured constant value of phase retardance of the metasurface sample is shown, which works as a half-wave plate and ensures the conversion efficiency of the incident LP beam to RCP and LCP components. For the metasurface 1000, the measured conversion efficiency may be close to unity at the working wavelength. The corresponding transmission efficiency (e.g., the ratio between the transmitted power and the incident power) may reach as high as 95%, which is higher than the achromatic etalenses with about 50% transmission efficiency. At 1100E, the measured slow axis characterization inside the silica glass is shown, which is along the radial direction of the birefringent sample. The orientation of the slow axis φ(x, y) ranges from 0 to π. As a result, the phase profiles of geometric phase elements (metasurface) experience a relative phase change, which is equal to 2φ(x, y), for example, from 0 to 2π. At 1100F, shows the finer structure of the metasurface 1000 with polariscope image along the radial direction.

Figure 12:
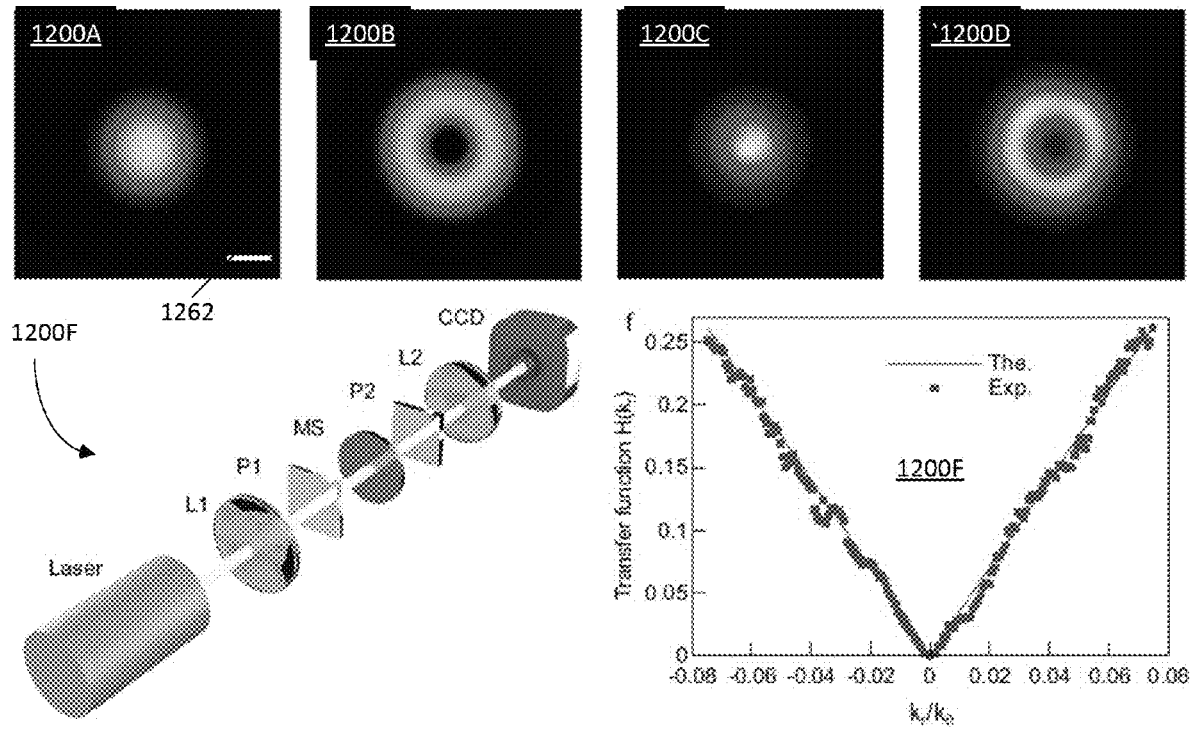
FIG. 12 depicts additional aspects related to an implementation example of a metasurface having a radial phase gradient pattern to enable two-dimensional (2D) edge detection, in accordance with some embodiments.

FIG. 12 depicts measurements of the spatial transfer function of a 2D metasurface, such metasurface 1000, in accordance with some embodiments. FIG. 12 at 1200A-B depict the calculated result without and with the spatial differentiator, respectively. FIG. 12 depicts a scale bar 1262 which corresponds to about 500 μm. At 1200C-D, the corresponding experimental results are shown. At 1200E, a block diagram of the system in which the lens (l) has a focal length 25 mm, P1 and P2 correspond to a pair of crossed polarizers, MS corresponds to the metasurface having a period 1000 and the CCD corresponds to a charge couple device. At 1200F, an example set of results both theoretical and experimental of the transfer function is plotted. To demonstrate the spatial differentiation function, the transfer function of the metasurface sample was measured. As shown at 1200E, the laser beam passes through L1 (f=25 mm) and P1, then incidents to the metasurface. The output spot is collected by the second focus lens L2 and then recorded by a CCD camera. The distances between the L1 and metasurface; metasurface and L2; the L2 and the CCD camera are equal to the focal distance (25 mm). The LCP and RCP components from the metasurface split along the radial direction, pass the analyzer (P2) and focus again by L2 for the collection and are finally recorded by the CCD camera (e.g., a DCC1645C, Thorlabs, USA). The intensity distribution $I_0$(x, y) before the L1 [1200C] and $I_1$(x, y) after the 4f system [1200D] are recorded separately by the CCD camera, and are consistent with the theoretical calculation results shown in 1200A-B. The electrical field distribution can be acquired based on the equation Ei (x, y)∝Ii (x, y). The transfer function is calculated as follows:

$$H(k_x, k_y) = \frac{E_1(u, v)}{E_0(u, v)},$$

where u=x/λf and v=y/λf. FIG. 12 at 1200F shows the transfer function result along the radial direction, in which $k_r = \sqrt{(k_x^2 + k_y^2)}$.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   detecting, based on a metasurface, at least one edge of an object being illuminated with a light source, wherein the metasurface provides an output that provides optical separation to enable the detecting of the at least one edge, wherein the optical separation is based on a phase profile configured on the metasurface, wherein the metasurface includes a surface structure with an orientation that varies from 0 to $\pi$ radians along one dimension, such that the output comprises a right hand circular polarized image of the illuminated object separated along the one dimension from a left hand circular polarized image of the illuminated object.

2. The method of claim 1, wherein the metasurface comprises a Pancharatnam-Berry (PB) phase metasurface.

3. The method of claim 1, wherein the metasurface includes the surface structure with the orientation that varies from 0 to $\pi$ radians, which causes a phase that varies from 0 radians through 2 $\pi$ radians.

4. A method comprising:
   detecting, based on a metasurface, at least one edge of an object being illuminated with a light source, wherein the metasurface provides an output that provides optical separation to enable the detecting of the at least one edge, wherein the optical separation is based on a phase profile configured on the metasurface, wherein the metasurface includes a surface structure with an orientation that varies from 0 to $\pi$ radians along a plurality of radial directions, such that the output comprises a right hand circular polarized image of the illuminated object separated along the plurality of radial directions from a left hand circular polarized image of the illuminated object.

5. A method comprising:
   detecting, based on a metasurface, at least one edge of an object being illuminated with a light source, wherein the metasurface provides an output that provides optical separation to enable the detecting of the at least one edge, wherein the optical separation is based on a phase profile configured on the metasurface, wherein the metasurface comprises a metalens, wherein a surface structure of the metalens is provided as a combination of lens phase laterally shifted with respect to each other to form an output comprising two images having a $\pi$ phase difference, wherein the $\pi$ phase difference causes optical separation between the two images and a cancelation of an overlapping region between the two images, and wherein the detecting, based in the metalens, provides one-dimensional edge detection of the illuminated object.

6. A method comprising:
   detecting, based on a metasurface, at least one edge of an object being illuminated with a light source, wherein the metasurface provides an output that provides optical separation to enable the detecting of the at least one edge, wherein the optical separation is based on a phase profile configured on the metasurface, wherein the metasurface comprises a metalens, wherein a surface structure of the metalens is provided as a combination of lens phase diagonally shifted with respect to each other to form an output comprising two images having a $\pi$ phase difference, wherein the $\pi$ phase difference causes optical separation between the two images and a cancelation of an overlapping region between the two images, and wherein the detecting, based in the metalens, provides two-dimensional edge detection of the illuminated object.

7. A method comprising:
   detecting, based on a metasurface, at least one edge of an object being illuminated with a light source, wherein the metasurface provides an output that provides optical separation to enable the detecting of the at least one edge, wherein the optical separation is based on a phase profile configured on the metasurface, wherein the metasurface is positioned between a first linear polarizer and a second linear polarizer, wherein the first linear polarizer is orthogonal to the second linear polarizer, wherein the second linear polarizer recombines a right hand circular polarized image and a left hand circular polarized image, removes an overlap between the right hand circular polarized image and the left hand circular polarized image, and outputs one or more edges for the object.

8. A method comprising:
   detecting, based on a metasurface, at least one edge of an object being illuminated with a light source, wherein the metasurface provides an output that provides optical separation to enable the detecting of the at least one edge, wherein the optical separation is based on a phase profile configured on the metasurface, wherein the metasurface is comprised in an optical path including at least one of the light source, the object, a first lens, a first linear polarizer, a second linear polarizer that is orthogonal to the first linear polarizer, a second lens, or an optical detector.

9. A metasurface for edge detection, the metasurface comprising:
   a nano or subwavelength surface structure configured to provide an output having optical separation to enable detection of at least one edge of an object being illuminated, wherein the optical separation is based on a phase profile configured on the nano or subwavelength surface structure of the metasurface, wherein the nano or subwavelength surface structure includes an orientation that varies from 0 to $\pi$ radians along one dimension, such that the output comprises a right hand circular polarized image of the illuminated object separated along the one dimension from a left hand circular polarized image of the illuminated object.

10. The metasurface for edge detection of claim 9, wherein the metasurface comprises a Pancharatnam-Berry (PB) phase metasurface.

11. The metasurface for edge detection of claim 9, wherein the nano or subwavelength surface structure includes the orientation that varies from 0 to π radians, which causes a phase that varies from 0 radians through 2π radians.

12. The metasurface for edge detection of claim 9, further comprising an optical system, wherein the metasurface is positioned between a first linear polarizer and a second linear polarizer, wherein the first linear polarizer is orthogonal to the second linear polarizer, wherein the second linear polarizer recombines the right hand circular polarized image and the left hand circular polarized image, removes an overlap between the right hand circular polarized image and the left hand circular polarized image, and outputs one or more edges for the object.

13. The metasurface for edge detection of claim 9, further comprising an optical system, wherein the metasurface is comprised in an optical path including at least one of a light source, the object, a first lens, a first linear polarizer, a second linear polarizer that is orthogonal to the first linear polarizer, a second lens, or an optical detector.

14. A metasurface for edge detection, the metasurface comprising:
a nano or subwavelength surface structure configured to provide an output having optical separation to enable detection of at least one edge of an object being illuminated, wherein the optical separation is based on a phase profile configured on the nano or subwavelength surface structure of the metasurface, wherein the nano or subwavelength surface structure includes an orientation that varies from 0 to π radians along a plurality of radial directions, such that the output comprises a right hand circular polarized image of the illuminated object separated along the plurality of radial directions from a left hand circular polarized image of the illuminated object.

15. A metasurface for edge detection, the metasurface comprising:
a nano or subwavelength surface structure configured to provide an output having optical separation to enable detection of at least one edge of an object being illuminated, wherein the optical separation is based on a phase profile configured on the nano or subwavelength surface structure of the metasurface, wherein the metasurface comprises a metalens, wherein the nano or subwavelength surface structure of the metalens is provided as a combination of lens phase laterally shifted with respect to each other to form an output comprising two images having a π phase difference, wherein the π phase difference causes the optical separation between the two images and a cancelation of an overlapping region between the two images, and wherein the edge detection of the illuminated object is in two dimensions.

16. A metasurface for edge detection, the metasurface comprising:
a nano or subwavelength surface structure configured to provide an output having optical separation to enable detection of at least one edge of an object being illuminated, wherein the optical separation is based on a phase profile configured on the nano or subwavelength surface structure of the metasurface, wherein the metasurface comprises a metalens, wherein the nano or subwavelength surface structure of the metalens is provided as a combination of lens phase diagonally shifted with respect to each other to form an output comprising two images having a π phase difference, wherein the π phase difference causes optical separation between the two images and a cancelation of an overlapping region between the two images, and wherein the edge detection of the illuminated object is in one dimension.

* * * * *